UNITED STATES PATENT OFFICE.

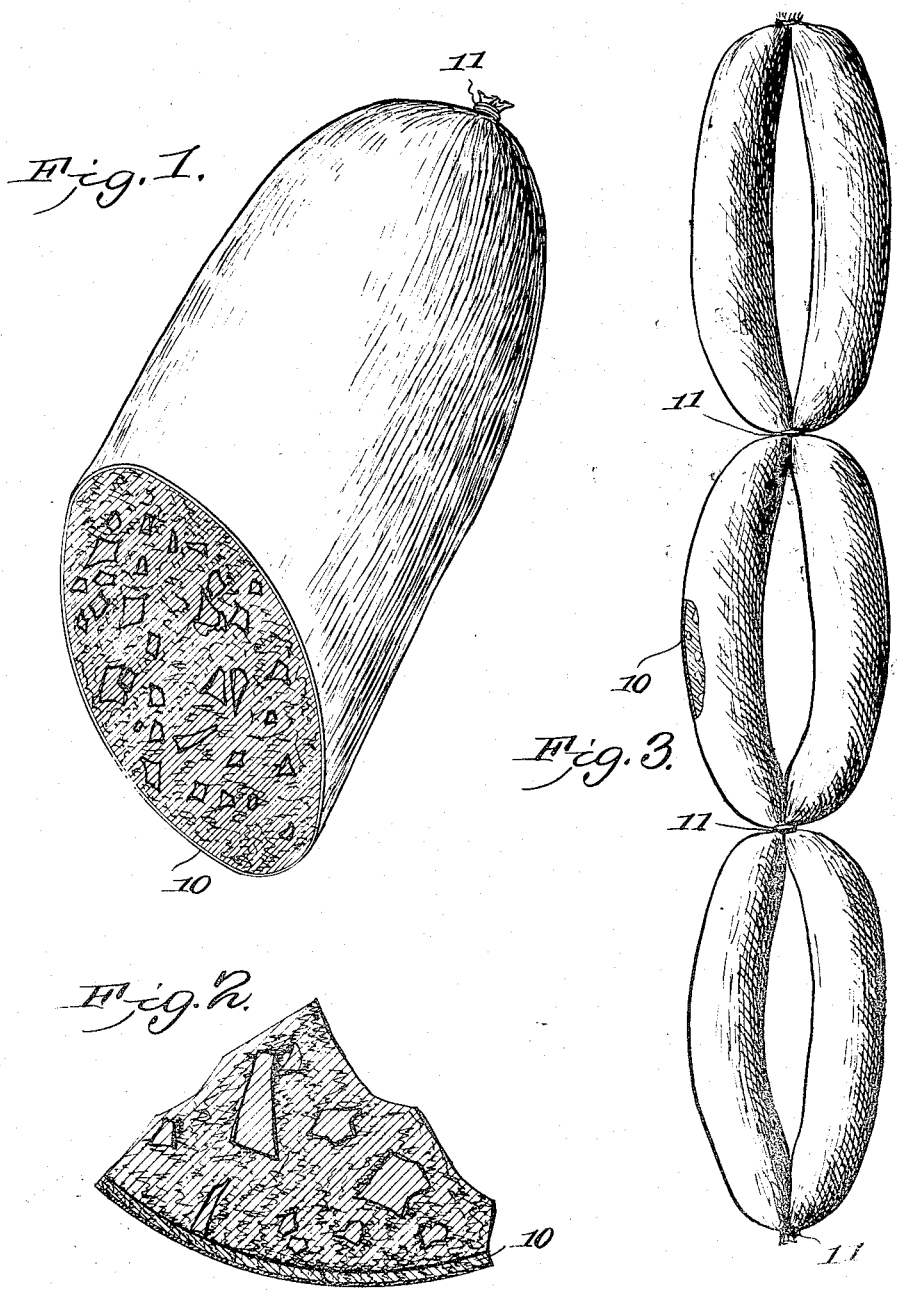

GEORGE HEPPE, OF PHILADELPHIA, PENNSYLVANIA.

ARTICLE OF CONFECTIONERY.

No. 873,369.   Specification of Letters Patent.   Patented Dec. 10, 1907.

Application filed January 5, 1906. Serial No. 294,761.

*To all whom it may concern:*

Be it known that I, GEORGE HEPPE, a citizen of the United States, residing at Philadelphia, in the county of Philadelphia and State of Pennsylvania, have invented a new and useful Article of Confectionery, of which the following is a specification.

This invention relates to the manufacture of confectionery, and has for its principal object to produce articles in imitation of sausages and other articles of food.

With this object in view, the invention consists in the novel article of confectionery hereinafter described and claimed.

In the accompanying drawings:—Figure 1 is a perspective view of an imitation sausage made in accordance with the invention, the view being in section. Fig. 2 is an enlarged sectional detail of the same. Fig. 3 is an elevation, partly in section, of a number of connected links of imitation sausage made in accordance with the invention.

Similar numerals of reference are employed to indicate corresponding parts throughout the several figures of the drawings.

In the manufacture of that general class of confectionery made in imitation of natural objects or articles of food, it is usual to employ anilin dyes, those having a coal tar base, being more or less poisonous and harmful in their nature and therefore objectionable.

In carrying out the present invention, one of the principal objects is to provide for the employment of coloring matter of a harmless nature, and it has been found after a long series of experiments that very many colors or tints of natural and prepared food may be made from cochineal or chocolate, or a combination of the two in proportions that vary in accordance with the tint or color to be produced.

The base of the confectionery forming the subject of the present invention is cocoanut, the meat being shredded and finely divided, and then mixed with a solution of sugar to which a quantity of cochineal has previously been added. The resultant mass is spread while still hot on a mixing table, and to it is added a number of comparatively large pieces of the white cocoanut meat, the whole mass being then thoroughly mixed together in order to distribute the white lumps, after which the mass is placed in an ordinary form of sausage stuffing machine, and is forced while still hot into a prepared tubular covering 10 of a slightly porous nature, this being afterwards tied, as indicated at 11, in order to form links of sausage, or to form a single large sausage.

The tubular covering is preferably in the form of an ordinary sausage casing, that is to say, a casing made from an animal intestine properly prepared and more or less porous in its nature so that the liquid sugar will ooze out through the covering. The casing, moreover, is edible and may be consumed with the contents.

Portions of the heated sugar will still remain in liquid form, and under pressure from the sausage machine this liquid will ooze out through the slightly porous skin or covering and will harden on the exterior, forming a smooth, glossy surface, which, in connection with the covering, will effectually protect the mass of candy from dust, dirt and atmospheric influences, the candy remaining fresh and moist for a practically indefinite period, so that it may be readily cut into slices at any time, or may be served in a variety of ways, depending on the particular type of sausage which it is made to imitate.

In some of the sausages where the color is not uniform, such for instance as liver puddings and the like, the mass of shredded and minced cocoanut is sub-divided and is separately treated in different vessels, where cochineal or chocolate, or a mixture of the two may be added in varying proportions for the purpose of producing the desired color or tint, and after this, portions of the contents of each kettle are mixed together and passed through the stuffing machine.

I claim:—

A new article of confectionery formed of finely divided cocoanut meat, colored with cochineal and mixed with a solution of sugar, the whole being inclosed in a thin protective casing of slightly porous nature through which a portion of the liquid sugar exudes to form an air impervious film.

In testimony that I claim the foregoing as my own, I have hereto affixed my signature in the presence of two witnesses.

GEORGE HEPPE.

Witnesses:
A. HEATON MINNICK,
LOUIS W. WIELMEIER.